Oct. 5, 1943.    F. E. FISCHER    2,330,822
CAPACITIVE FOLLOW-UP CONTROL ELEMENT
Filed Jan. 24, 1940
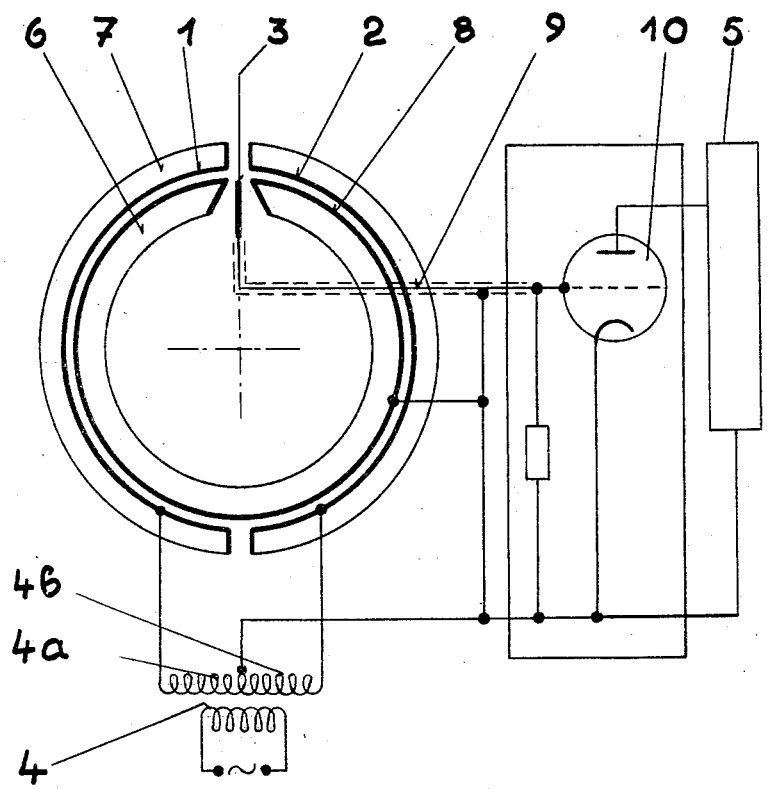
INVENTOR
FRIEDRICH ERNST FISCHER
BY
ATTORNEYS

UNITED STATES PATENT OFFICE 2,330,822

CAPACITIVE FOLLOW-UP CONTROL ELEMENT

Friedrich Ernst Fischer, Zurich-Erlenbach, Switzerland

Application January 24, 1940, Serial No. 315,326
In Switzerland February 6, 1939

12 Claims. (Cl. 178—44)

This invention relates to a capacitive follow-up control element which is arranged in a differential or bridge circuit and which comprises the known combination of an electrical follow-up device with a so-called differential condenser which is likewise known. The invention is particularly concerned with the favourable arrangement and dimensioning of the different capacitive plates or coatings of the differential condenser for the purpose of enabling great accuracy of operation to be obtained.

It is known to employ condensers in differential or bridge connected systems. They are employed, for example, for giving an indication of the angle of rotation of a rotatable member in the form of an electrical quantity such as a voltage. The combination of a differential condenser with an electrical follow-up device is also known in which the magnitude measured by the differential condenser is not only indicated but is also employed simultaneously for the cancellation of the relative displacement or lag produced by the rotation of the controlling part with respect to the follower part, the condenser acting on means which operate the follower part to follow the indicator part which has been moved.

It has not heretofore been possible to obtain great accuracy with apparatus constructed on the principle of the capacitive follow-up control elements referred to above and it is accordingly an object of the present invention to provide means whereby even the smallest movements of the indicator part can be indicated and followed with the greatest accuracy. This is achieved mainly by the favourable arrangement and dimensioning of the different capacitive plates or coatings of the differential condenser, while improved efficiency can be obtained by the use of a screening plate or coating on the controlling part.

According to the invention, in a capacitive differential follow-up control element having a movable controlling part and a movable follower part, at least four capacitive plates or coatings are used at least two of which are arranged on each of the said parts.

The following description, in which reference is made to the accompanying drawing, will enable the invention to be readily understood and carried into effect.

In the drawing there is shown diagrammatically a capacitive differential control element according to the invention.

The principle of operation of the invention will be clear from the drawing which illustrates a differential condenser having capacitive plates or coatings 1, 2 and 3. A voltage taken from, for example, a transformer 4 is applied to the plates 1 and 2, the centre point of the transformer secondary winding being connected to, for example, a suitable measuring device 5. The plate 3 is arranged on a rotatable part 6 the rotation of which is to be measured and it is also connected with the measuring instrument 5. In the zero position of the movable part 6, the capacitances between the plate 3 and the two plates 1 and 2 are equal; i. e. the bridge formed by the two condensers 1—3 and 2—3 and by the transformer 4 is balanced.

Upon the part 6 with the plate 3 being rotated the capacitances of the condensers 1—3 and 2—3 naturally vary, in such a manner that as one capacitance increases, the other decreases. It will readily be seen that, in this case, the bridge becomes unbalanced and a voltage which is proportional to the rotation of the moving part 6 can be measured on the measuring instrument 5.

The application of the differential condenser shown to a follow-up control element is comparatively simple. Now, not only the part 6, but also the part 7 carrying the plates 1 and 2 is made rotatable, but in such a manner that, by means of a control device forming part of or associated with the measuring instrument, it is always rotated, after the part 6 has been given a displacement, until the bridge formed by the capacitances 1—3 and 2—3 and by the transformer windings 4a and 4b is again balanced.

The present invention provides the advantage of giving great accuracy, so that even the smallest movements of the indicator part can be followed. The range of utility of the capacitive follow-up control element is thus considerably widened.

One of the important features of the invention, as indicated above, resides in the relative dimensioning of the several capacitive plates. It will be noted particularly that the plate 3 is of small dimensions in the direction of movement, its dimensions in this direction being less than 0.5 millimetre.

In addition, there is provided an additional plate or coating 8 which surrounds the coating 3 and acts as a screen. Thus at least two plates or coatings are provided both on the movable controlling part 6 and on the movable follower part 7.

Mathematical calculation of the characteristics of the capacitive follow-up control element according to the invention having the screen 8 and with the plate 3 made in, for example, the form of a wire or strip less than 0.5 millimetre thick in the direction of movement, has shown that an especially great sensitivity and a great follow-up accuracy can be obtained when the distance between the controlling part 6 and the follower part 7 is less than 0.5 millimetre at least at one place, i. e. in the vicinity of the plate 3, and when the two plates 1 and 2 of the follower part 7 so closely approach each other that their distance apart is less than 0.5 millimetre at at least one place, i. e. in the vicinity of the plate 3.

For increasing the desired screening action, the screen 8 is, according to a further feature of the invention, brought to a potential which is equal to the arithmetical mean of the potentials of the plates 1 and 2 on the other moving part. The lead 9 to the plate 3 is likewise advantageously screened and the potential of this screening as well as that of the screen 8 is made equal to the arithmetical mean of the potentials of the plates 1 and 3. In order to eliminate harmful capacitances, the lead 9 may be constructed as a low-capacity cable.

In many cases, it will be advantageous not to connect the plate 3 directly to a measuring instrument, but to couple it first with an amplifier; in such cases, the screened lead 9 may be connected, for example, with the grid of an amplifier valve 10.

It is obvious that the potential differences between different plates or coatings of the follow-up control element of the invention cannot be made of any desired size on account of the small spacings at different parts. The upper limit of the permissible potential difference is given by the ionising potential of the air. Consequently, in a follow-up control element constructed in accordance with the invention, there should generally not exist any potential differences between different plates greater than 15 volts.

The invention is naturally not limited to capacitive follow-up control elements of cylindrical shape as shown in the constructional example which has been given for explanatory purposes. Obviously the same advantages with respect to the hitherto known follow-up control elements can be obtained with a device utilising capacitive plates of flat form and in which the features of the invention have been incorporated.

It is moreover, clear that the example given in the foregoing description only represents one constructional form which can be easily modified by one skilled in the art, without departing from the invention as set forth in the appended claims.

Having now particularly described and ascertained the nature of my said invention and in what manner the same is to be performed, I declare that what I claim is:

1. A capacitive differential follow-up mechanism having a movable controlling part adapted to be actuated from outside the mechanism, and a follower part mounted for movement relative to the controlling part and adapted to be returned to the same position relatively to the controlling part following a movement of the latter, said mechanism including at least four capacitive plates, at least two of which are arranged on each of the said movable parts, the dimension of one of the plates on one of the movable parts in the direction of movement being less than the dimension of the gap between the adjacent opposite pair of plates, said one plate being normally positioned opposite such gap.

2. A capacitive differential follow-up control mechanism having a movable controlling part and a movable follower part, said mechanism including at least four capacitive plates, at least two of which are arranged on each of said movable parts, the distance between the capacitive plates of the movable controlling part and of the movable follower part being less than 0.5 millimetre at at least one place.

3. A capacitive differential follow-up control mechanism having a movable controlling part and a movable follower part, said mechanism including at least four capacitive plates, at least two of which are arranged on each of said movable parts, one of the capacitive plates on one of the movable parts having a dimension in the direction of movement which is less than 0.5 millimetre.

4. A capacitive differential follow-up control mechanism having a movable controlling part and a movable follower part, said mechanism including at least four capacitive plates, at least two of which are arranged on each of said movable parts, one of the capacitive plates on one of the movable parts having a dimension in the direction of movement which is less than 0.5 millimetre, while on the other of the movable parts two coatings are separated from each other by a distance which is less than 0.5 millimetre at at least one place.

5. A capacitive differential follow-up control mechanism having a movable controlling part and a movable follower part, said mechanism including at least four capacitive plates, at least two of which are arranged on each of said movable parts, one of the capacitive plates on one of the movable parts having a dimension in the direction of movement which is less than 0.5 millimetre, said control mechanism including at least one further plate in the vicinity of the last named plate and having a potential which is substantially equal to the arithmetical mean of the potentials of two plates on the other movable part, said last named plates being spaced from each other by a distance of less than 0.5 millimetre.

6. A capacitive differential follow-up control mechanism having a movable controlling part and a movable follower part, said mechanism including at least four capacitive plates, at least two of which are arranged on each of said movable parts, one of the capacitive plates on one of the movable parts having a dimension in the direction of movement which is less than 0.5 millimetre, and a screened lead connected to such plate, two plates on the other of the movable parts being separated from each other by a distance which is less than 0.5 millimetre at at least one place, at least one further plate in the vicinity of the first mentioned plate having a potential which is substantially equal to the arithmetical mean of the potentials of the second mentioned plates, the potential of the screen being substantially equal to the arithmetical mean of the potentials of the two plates on the said other movable part.

7. A capacitive differential follow-up control mechanism having a movable controlling part and a movable follower part, said mechanism including at least four capacitive plates, at least two of which are arranged on each of said movable parts, one of the capacitive plates on one of the movable parts having a dimension in the direction of movement which is less than 0.5 millimetre, and a screened lead connected to such plate, two plates on the other of the movable parts being separated from each other by a distance which is less than 0.5 millimetre at at least one place, at least one further plate in the vicinity of the first mentioned plate having a potential which is substantially equal to the arithmetical mean of the potentials of the second mentioned plates, the potential of the screen being substantially equal to the arithmetical mean of the potentials of the two plates on the said other movable part, and an amplifier including a valve, the said screened lead being connected to the grid of said valve.

8. A capacitive differential follow-up control mechanism having a movable controlling part and a movable follower part, said mechanism including at least four capacitive plates, at least two of which are arranged on each of said movable parts, and a source of potential providing a maximum of 15 volts between the different capacitive plates of the control mechanism.

9. A capacitive differential follow-up control mechanism having a movable controlling part and a movable follower part, said mechanism including at least four capacitive plates, at least two of which are arranged on each of said movable parts, one of the capacitive plates or coatings on one of the movable parts having a dimension in the direction of movement which is less than 0.5 millimetre, a screened lead connected to such plate, two plates on the other of the movable parts being separated from each other by a distance which is less than 0.5 millimetre at at least one place, at least one further plate in the vicinity of the first mentioned plate having a potential which is substantially equal to the arithmetical mean of the potentials of the second mentioned plates, the potential of the screen being substantially equal to the arithmetical mean of the potentials of the two plates on the said other movable part, and a source of potential providing a maximum of 15 volts between the different capacitive plates of the control element.

10. A differential capacitive follow-up control mechanism having a movable controlling part comprising at least two plates, and a movable follower part including at least two plates, one of the plates of the controlling part serving as a controller, and a second being positioned to act as a screen against disturbing stray fields, the distance of the individual plates from each other and the effective width of the controller plate in the direction of movement being relatively small and of the same order of magnitude.

11. A control mechanism as set forth in claim 10, wherein the distances defined are of the order of 0.5 millimetre.

12. A differential capacitive follow-up control mechanism having a movable controlling part comprising at least two plates, a movable follower part including at least two plates, one of the plates of the controlling part serving as a controller, and a second being positioned to act as a screen against disturbing stray fields, and an amplifier having an amplifier tube, the controller plate having a small dimension in the direction of movement, and a screened lead connected both to the controller plate and to the grid of the amplifier tube.

FRIEDRICH ERNST FISCHER.